United States Patent
Bower et al.

(10) Patent No.: US 10,645,189 B2
(45) Date of Patent: *May 5, 2020

(54) SIGNATURE BASED DISTRIBUTED INVENTORY CACHING

(71) Applicant: LENOVO ENTERPRISE SOLUTIONS (SINGAPORE) PTE. LTD., New Tech Park (SG)

(72) Inventors: Fred Bower, Durham, NC (US); Rodney H. Brown, Cary, NC (US); Qiao Neng Qian, Shanghai (CN)

(73) Assignee: LENOVO ENTERPRISE SOLUTIONS (SINGAPORE) PTE. LTD., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 16/359,656

(22) Filed: Mar. 20, 2019

(65) Prior Publication Data
US 2019/0238654 A1 Aug. 1, 2019

Related U.S. Application Data

(63) Continuation of application No. 14/833,958, filed on Aug. 24, 2015, now Pat. No. 10,264,092.

(51) Int. Cl.
*H04L 29/08* (2006.01)
*H04L 12/26* (2006.01)
*H04L 12/24* (2006.01)

(52) U.S. Cl.
CPC ........ *H04L 67/2852* (2013.01); *H04L 67/125* (2013.01); *H04L 41/0896* (2013.01); *H04L 43/10* (2013.01)

(58) Field of Classification Search
None
See application file for complete search history.

(56) References Cited

U.S. PATENT DOCUMENTS

| | | | | |
|---|---|---|---|---|
| 7,613,822 B2* | 11/2009 | Joy | ......... | H04L 29/06 709/227 |
| 7,636,917 B2* | 12/2009 | Darling | ......... | H04L 29/06 718/105 |
| 9,218,616 B2* | 12/2015 | Van Biljon | ......... | G06Q 30/04 |
| 2006/0095434 A1* | 5/2006 | McCullough | ........ | G06Q 10/087 |

(Continued)

*Primary Examiner* — Davoud A Zand
(74) *Attorney, Agent, or Firm* — Jeffrey Streets

(57) ABSTRACT

Embodiments of the present invention provide a method, system and computer program product for signature based distributed inventory caching. In an embodiment of the invention, a for signature based distributed inventory caching includes polling from a centralized management solution an endpoint aggregating state information for different monitored resources, and receiving in response to the polling a signature for one or more of the monitored resources aggregated by the endpoint. The method also includes comparing the received signature to a signature stored in the solution in connection with the endpoint. In response to a determination that the compared signatures differ, the method includes updating a cache in the solution with state information for the endpoint, computing a new signature for the state information, and replacing the stored signature with the new signature. Otherwise the method includes bypassing any updating of the cache.

15 Claims, 2 Drawing Sheets

(56) References Cited

U.S. PATENT DOCUMENTS

2015/0156183 A1* 6/2015 Beyer .................... H04L 63/08
 726/4
2015/0308856 A1* 10/2015 Srinivasan ............ G01D 4/002
 340/870.02

* cited by examiner

SIGNATURE BASED DISTRIBUTED INVENTORY CACHING

CROSS-REFERENCE TO RELATED APPLICATIONS

This application is a Continuation Application of U.S. application Ser. No. 14/833,958, filed on Aug. 24, 2015, the entirety of which is incorporated herein by reference.

BACKGROUND OF THE INVENTION

Field of the Invention

The present invention relates to managed resource management in a data center and more particularly to data cache support for managed resource management.

Description of the Related Art

The modern data center includes a multiplicity of different devices providing a multiplicity of resources which in combination, provide one or more computing services to end users over one or more computer communications networks. Within the data center, it is essential to monitor the state of each device so that unacceptable service interruptions can be avoided. Managing the state of a single device is simplistic in so far as an administrator need only physically view the operation of the single device. However, managing the state of an incredibly large number of devices does not allow for the physical viewing of each device by an administrator. Instead, administrators rely upon centralized management tools to collect and process state data from a multiplicity of monitored devices so as to programmatically present the state of the managed devices to the administrator and to alert the administrator of any faults detected amongst the managed devices.

In practice, managing the state of each individual resource is time consuming, computationally expensive and impractical. Therefore, oftentimes managing the state of different resources in a data center requires aggregation. Aggregation refers to the collection of state data for a set of resources, related or unrelated, and the presentation of a single aggregate state for the resources in the set. To achieve a higher degree of aggregation, techniques to minimize the state data processing at the centralized management solution must be employed. However, one of the elements of state data processing that is often a limiting factor to scaling in an aggregated solution is the network bandwidth required to communicate state data to the centralized management solution. Therefore, it is common to utilize programming techniques, such as caching of data, to provide for greater aggregation per instance of management software by caching the state of aggregated sets of managed resources for later consumption by the centralized management solution.

Maintaining the consistency of cached data with the actual state of the corresponding set of aggregated resources is not without challenge. At present, it is widely known to utilize the processing of emitted alerts from monitored resources in order to trigger a refresh of cached data. To work properly, alert based refreshing requires all alerts to be reliably delivered in a timely fashion. Yet, in a typical data communications network, this reliable, timely delivery cannot be guaranteed. As such, the management solution periodically refreshes cached data by polling the managed resources. By polling the managed resources, it is guaranteed that the solution captures the correct state of the managed resources contemporaneously with the polling.

Of course, the polling process incurs a transactional cost in situations where the cached data already was accurate and need not have been refreshed. The cost of unproductive polling then translates into either a reduction of possible scale of management by the device given the cost of polling for large numbers of devices, or a loss of fidelity in the cached data due to a required large interval of polling so as to avoid overtaxing the network. To address this paradox, management solutions attempt to combine both methods, by relying upon alerts to trigger a cache refresh but utilizing a periodic polling cycle to ensure that any missed alerts are gracefully handled in a bounded time—but in doing so, a less than optimal solution results.

BRIEF SUMMARY OF THE INVENTION

Embodiments of the present invention address deficiencies of the art in respect to monitoring of aggregated resources in a centralized management solution and provide a novel and non-obvious method, system and computer program product for signature based distributed inventory caching. In an embodiment of the invention, a method for signature based distributed inventory caching includes polling from a centralized management solution an endpoint that aggregates state information for different monitored resources, and receiving in response to the polling a signature for one or more of the monitored resources aggregated by the endpoint. The received signature is then compared to a signature stored in the solution in connection with the endpoint. In response to a determination that the compared signatures differ, the cache is updated in the solution with state information for the endpoint, a new signature is computed for the cached state information, and the stored signature is replaced with the new signature. Otherwise the method includes bypassing any updating of the cache.

In one aspect of the embodiment, the polling request is transmitted by the centralized management solution to a multiplicity of endpoints, each of the endpoints aggregating state information in a corresponding cache for a different set of monitored resources. In another aspect of the embodiment, the monitored resources of each different set are logically grouped together according to a common type of resources. In yet another aspect of the embodiment, the monitored resources of each different set are logically grouped together according to a common cost of monitoring state changes therein. Finally, in even yet another aspect of the embodiment, the endpoint stores both multiple different signatures for multiple different combinations of the monitored resources and corresponding tokens each referencing a different one of the signatures, the endpoint returning to the solution in response to the polling only one of the signatures corresponding to a token provided by the solution during the polling.

In another embodiment of the invention, a centralized management data processing system is configured for signature based distributed inventory caching. The system includes a host computing system communicatively coupled to a multiplicity of different end points over a computer communications network. The host computing system in turn includes one or more computers each with memory and at least one processor. The system also includes a cache of state information for different monitored resources aggregated for monitoring by one or more of the end points. The system yet further includes a centralized management solution coupled to the cache and executing in the host computing system. The solution provides management services of the monitored resources based upon the state information in the cache.

Finally, the system includes a signature based distributed inventory caching module executing in the memory of the host computing system. The module includes program code enabled upon execution to polling each endpoint and to receive in response to the polling from each endpoint, a signature for one or more of the monitored resources, to compare for each signature received from the endpoint a signature stored in the solution in connection with the endpoint, and to respond to a determination that the compared signatures differ by updating the cache with state information for the endpoint, computing a new signature for the state information, and replacing the stored signature with the new signature, but otherwise bypassing any updating of the cache.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for signature based distributed inventory caching. In accordance with an embodiment of the invention, a signature is computed by a centralized management solution for each cached state of each corresponding monitored resource aggregated in an endpoint aggregating state information for a set of monitored resources. Periodically, in response to polling by the solution, signatures are received from the endpoint representative of correspondingly different states for associated ones of the resources. Each of the signatures are compared to those already stored in the solution in respect to the associated ones of the resources. When an inequality exists between signatures for one of the monitored resources, the solution seeks an update from the endpoint of the state for the one of the monitored resources, the state is cached in the solution and the signature for the one of the monitored resources is replaced in the solution with a newly computed signature for the state of the one of the monitored resources.

Figure 1:
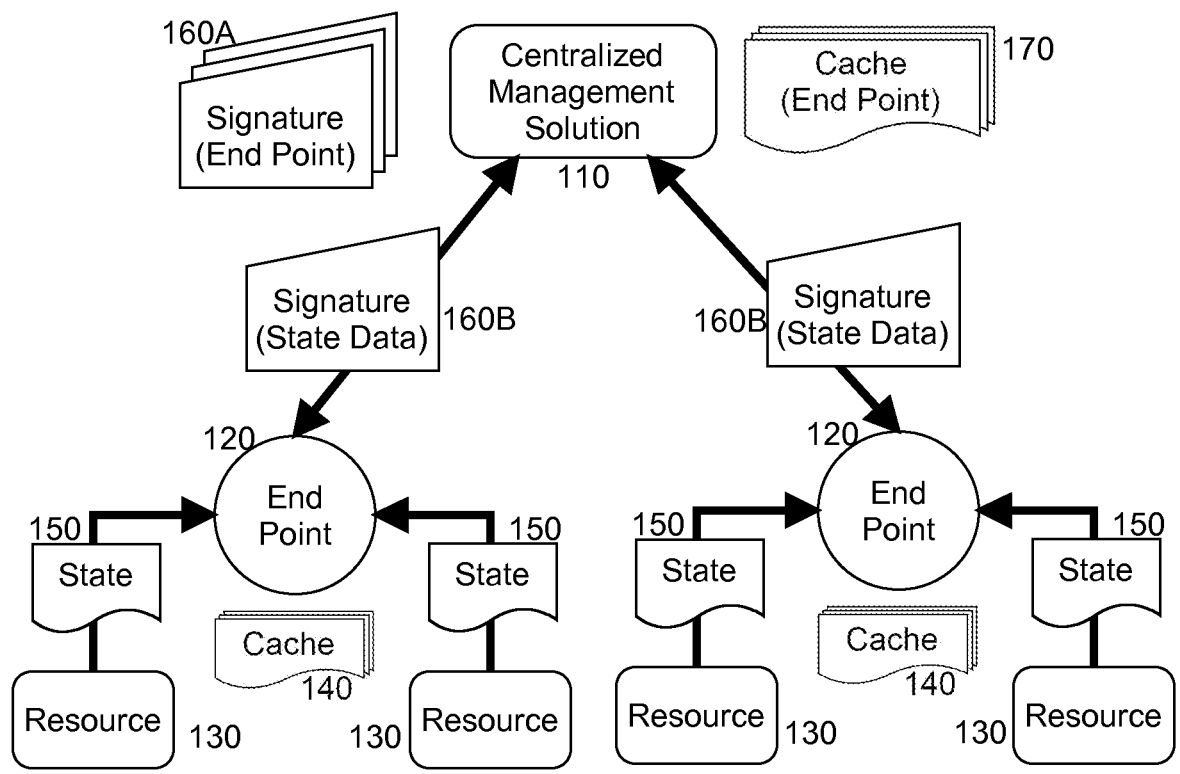
FIG. 1 is a pictorial illustration of a process for signature based distributed inventory caching.

In further illustration, FIG. 1 pictorially shows a process for signature based distributed inventory caching. As shown in FIG. 1, a centralized management solution 110 monitors state information 150 for different monitored resources 130 in a computing enterprise. The centralized management solution 110 monitors the resources 130 through aggregating endpoints 120. The aggregating endpoints 120 each collect and cache the state information 150 for the monitored resources 130 and, optionally, stores the state information 150 in a local cache 140. Thereafter, a centralized cache 170 for each endpoint 120 is refreshed to include the state information 150 and a different signature 160A computed for the state information 150 for each of the endpoints 120. Likewise, a signature 160B in each of the endpoints 120 is computed.

In this way, so long as the state information 150 cached in one of the endpoints 120 is the same as the state information cached in the cache 170 for the one of the endpoints 120, the signature 160A for the one of the endpoints 120 and the signature of the one of the endpoints 120 will remain identical. To wit, a polling interval is observed by the centralized management solution 110. When the polling interval lapses, the centralized management solution 110 retrieves the signature 160B from each of the endpoints 120 and compares each received one of the signatures 160B for a corresponding one of the endpoints 120 to a stored one of the signatures 160A for the corresponding one of the endpoints 120. If the signatures 160A, 160B match, no further action is required. If the signatures 160A, 160B do not match, the cache 170 is updated with the state information used to calculate the signature 160B for the corresponding one of the endpoints 120 and new signatures 160A, 160B computed. Consequently, cache refreshing only occurs when a cache refresh is warranted, and is only done for the subset of state data that has been modified, thus minimizing communication overhead to the centralized management solution 110.

Figure 2:
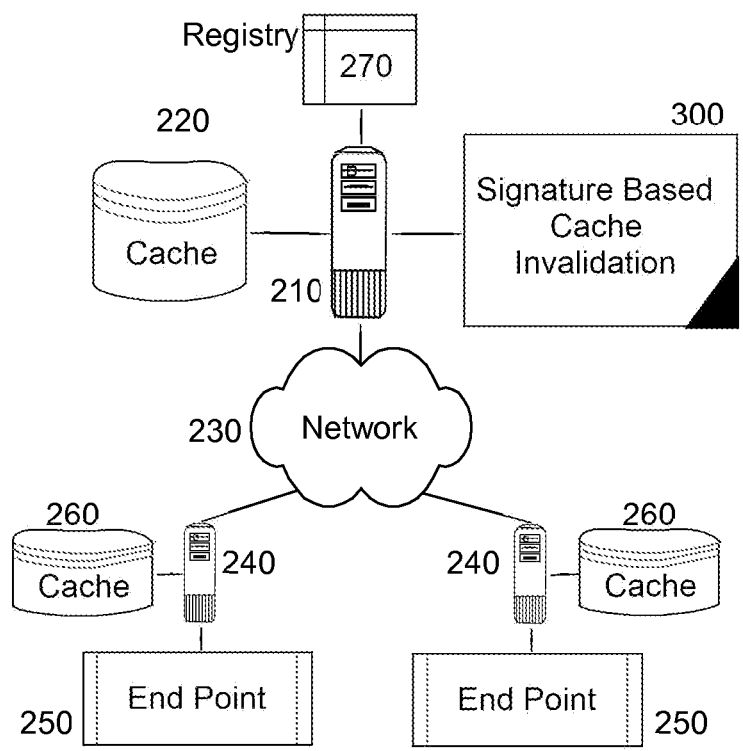
FIG. 2 is a schematic illustration of a centralized management data processing system configured for signature based distributed inventory caching; and, FIG. 3 is a flow chart illustrating a process for signature based distributed inventory caching.

The process described in connection with FIG. 1 is implemented in a data processing system. In yet further illustration, FIG. 2 schematically shows a centralized management data processing system configured for signature based distributed inventory caching. The system includes a host computing system 210 that includes memory and at least one processor. The host computing system 210 is coupled to other computing devices 240 over computer communications network 230. Each of the other computing devices 240 supports the operation of an aggregating endpoint 250.

The aggregating endpoint 250 monitors different computing resources and collects and caches state information for the resources in a coupled cache 260. The aggregating endpoint 250 additionally computes a signature such as a hash of the state information stored in the coupled cache 260. In one aspect of the embodiment, the different computing resources are logically grouped in a set for monitoring by a common aggregating endpoint 250 based upon a common type of resource. In another aspect of the embodiment, the different computing resources are logically grouped in a set for monitoring by a common aggregating endpoint 250 according to a common cost of monitoring state changes therein.

Of note, a signature based cache invalidation module 300 executes in the memory of the host computing system 210. The module 300 includes program code that during execution, periodically polls each of the endpoints 250 to retrieve the signature. The program code of the module 300 thereafter compares each retrieved signature from a corresponding one of the endpoints 250 to a previously computed signature for state information already present in a coupled cache 220 for a corresponding one of the endpoints 250. If the signatures differ, the program code of the module 300 updates the coupled cache 220 with new state information from the corresponding one of the endpoints 250 and the program code computes a new signature.

In one aspect of the invention, both the signature based cache invalidation module 300 and each endpoint 250 pre-specify state information to be collected so that the signature computed by each endpoint 250 and the signature based cache invalidation module 300 are computed based upon the same state information collected. To support the dynamic modification of the state information collected, a registry 270 is maintained in which each of the endpoints 250 registers the collected state information so that the signature based cache invalidation module 300 maintains an awareness of the state information collected from which the signatures are computed. Whenever one of the endpoints 250 elects to change the state information collected in a corresponding cache 260, the cache 220 is updated for the one of the endpoints 250 and new signatures computed.

Figure 3:
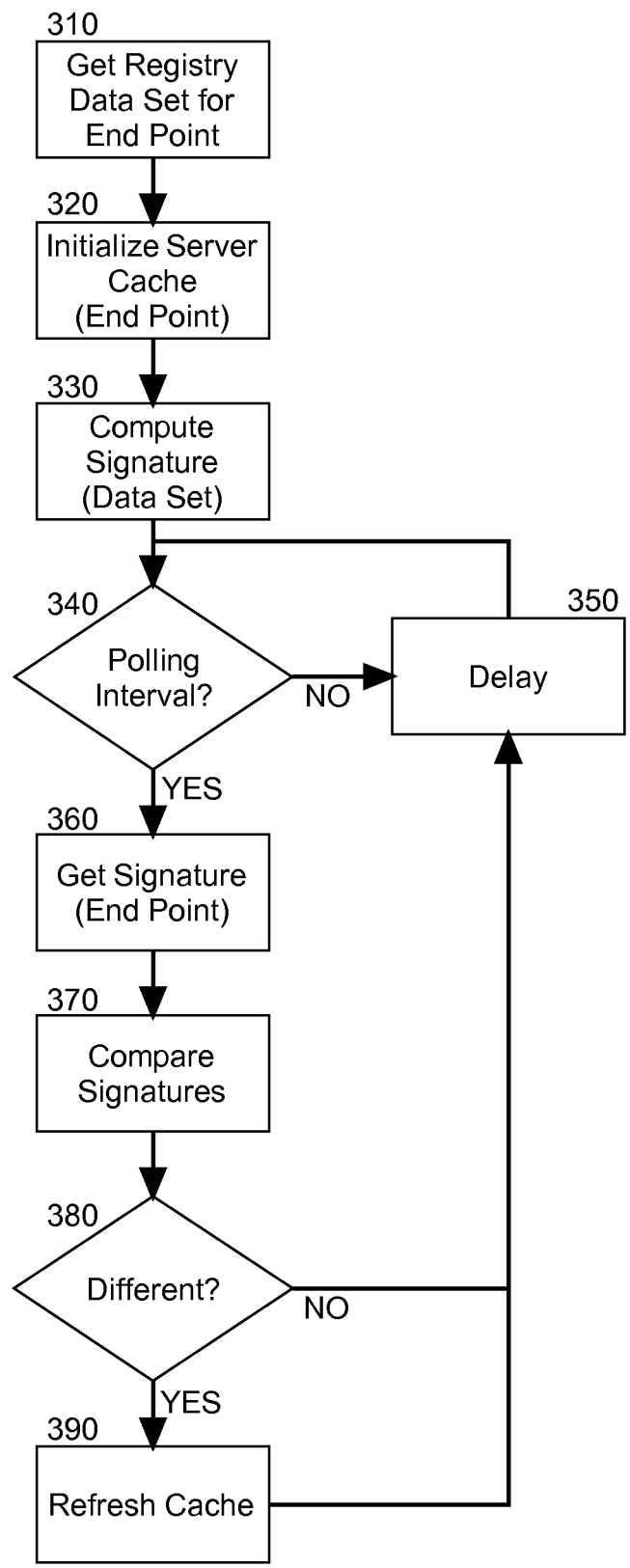

In even yet further illustration of the operation of the signature based cache invalidation module 300, FIG. 3 is a flow chart illustrating a process for signature based distributed inventory caching. Beginning in block 310, a data set for an aggregating endpoint of interest is registered in the registry, and in block 320 the cache is initialized with state information for the data set as received from the endpoint of interest. In block 330, a signature is computed, for example a hash of the state information for the data set, in connection with the endpoint of interest. Thereafter, the endpoint of interest is polled at a specified polling interval.

In this regard, in decision block 340 it is determined whether or not the polling interval has occurred. If not, in block 350 a delay can be incurred until it is again determined in block 340 if the polling interval has occurred. Once the polling interval has occurred, in block 360, the signatures for the endpoint of interest are retrieved from the endpoint of interest and from local storage, respectively and compared to one another in block 370. In decision block 380, if the comparison shows an inequality of signatures, then in block 390 the local cache is refreshed with the state information from the endpoint and the signature is recomputed and stored locally for a subsequent polling interval. Thereafter, the process returns to block 350.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method for signature based distributed inventory caching comprising:
    polling from a centralized management solution an endpoint aggregating state information for different monitored resources;
    receiving in response to the polling a signature for one or more of the different monitored resources aggregated by the endpoint;
    comparing the received signature to a signature stored in the centralized management solution in connection with the endpoint; and,
    responsive to a determination that the compared signatures differ, updating a cache in the centralized management solution with state information for the endpoint, computing a new signature for the state information, and replacing the stored signature with the new signature, but otherwise bypassing any updating of the cache.

2. The method of claim 1, wherein the polling request is transmitted by the centralized management solution to a multiplicity of endpoints, each of the endpoints aggregating state information in a corresponding cache for a different set of monitored resources.

3. The method of claim 2, wherein the monitored resources of each different set are logically grouped together according to a common type of resources.

4. The method of claim 2, wherein the monitored resources of each different set are logically grouped together according to a common cost of monitoring state changes therein.

5. The method of claim 1, wherein the endpoint stores both multiple different signatures for multiple different combinations of the monitored resources and corresponding tokens each referencing a different one of the signatures, the endpoint returning to the solution in response to the polling only one of the signatures corresponding to a token provided by the solution during the polling.

6. A centralized management data processing system configured for signature based distributed inventory caching, the system comprising:
    a host computing system communicatively coupled to a multiplicity of different end points over a computer communications network, the host computing system comprising one or more computers each with memory and at least one processor;
    a cache of state information for different monitored resources aggregated for monitoring by one or more of the end points;
    a centralized management solution coupled to the cache and executing in the host computing system, the centralized management solution providing management services of the monitored resources based upon the state information in the cache; and,
    a signature based distributed inventory caching module executing in the memory of the host computing system, the module comprising program code enabled upon execution to polling each endpoint and to receive in response to the polling from each endpoint, a signature for one or more of the monitored resources, to compare for each signature received from the endpoint a signature stored in the centralized management solution in connection with the endpoint, and to respond to a determination that the compared signatures differ by updating the cache with state information for the endpoint, computing a new signature for the state information, and replacing the stored signature with the new signature, but otherwise bypassing any updating of the cache.

7. The system of claim 6, wherein the polling request is transmitted by the centralized management solution to a multiplicity of endpoints, each of the endpoints aggregating state information in a corresponding cache for a different set of monitored resources.

8. The system of claim 7, wherein the monitored resources of each different set are logically grouped together according to a common type of resources.

9. The system of claim 6, wherein the monitored resources of each different set are logically grouped together according to a common cost of monitoring state changes therein.

10. The system of claim 6, wherein the endpoint stores both multiple different signatures for multiple different combinations of the monitored resources and corresponding tokens each referencing a different one of the signatures, the endpoint returning to the centralized management solution in response to the polling only one of the signatures corresponding to a token provided by the centralized management solution during the polling.

11. A computer program product for signature based distributed inventory caching, the computer program product comprising a non-transitory computer readable storage medium having program instructions embodied therewith, the program instructions executable by a device to cause the device to perform a method comprising:

polling from a centralized management solution an endpoint aggregating state information for different monitored resources;

receiving in response to the polling a signature for one or more of the monitored resources aggregated by the endpoint;

comparing the received signature to a signature stored in the centralized management solution in connection with the endpoint; and, responsive to a determination that the compared signatures differ, updating a cache in the centralized management solution with state information for the endpoint, computing a new signature for the state information, and replacing the stored signature with the new signature, but otherwise bypassing any updating of the cache.

12. The computer program product of claim 11, wherein the polling request is transmitted by the centralized management solution to a multiplicity of endpoints, each of the endpoints aggregating state information in a corresponding cache for a different set of monitored resources.

13. The computer program product of claim 11, wherein the monitored resources of each different set are logically grouped together according to a common type of resources.

14. The computer program product of claim 11, wherein the monitored resources of each different set are logically grouped together according to a common cost of monitoring state changes therein.

15. The computer program product of claim 11, wherein the endpoint stores both multiple different signatures for multiple different combinations of the monitored resources and corresponding tokens each referencing a different one of the signatures, the endpoint returning to the centralized management solution in response to the polling only one of the signatures corresponding to a token provided by the centralized management solution during the polling.

* * * * *